(12) United States Patent
Chen et al.

(10) Patent No.: US 11,270,476 B2
(45) Date of Patent: Mar. 8, 2022

(54) METHOD AND SYSTEM FOR PROVIDING PHOTOREALISTIC CHANGES FOR DIGITAL IMAGE

(71) Applicant: METAIL LIMITED, London (GB)

(72) Inventors: Yu Chen, London (GB); Jim Downing, London (GB); Tom Adeyoola, London (GB); Sukrit Shankar, London (GB)

(73) Assignee: METAIL LIMITED, London (GB)

( * ) Notice: Subject to any disclaimer, the term of this patent is extended or adjusted under 35 U.S.C. 154(b) by 0 days.

(21) Appl. No.: 17/050,587

(22) PCT Filed: Apr. 23, 2019

(86) PCT No.: PCT/GB2019/051135
§ 371 (c)(1),
(2) Date: Oct. 26, 2020

(87) PCT Pub. No.: WO2019/207296
PCT Pub. Date: Oct. 31, 2019

(65) Prior Publication Data
US 2021/0241500 A1 Aug. 5, 2021

(30) Foreign Application Priority Data
Apr. 24, 2018 (GB) .................................... 1806685

(51) Int. Cl.
*G06T 11/00* (2006.01)
*G06T 7/194* (2017.01)
(Continued)

(52) U.S. Cl.
CPC .......... *G06T 11/001* (2013.01); *G06K 9/6256* (2013.01); *G06N 20/00* (2019.01);
(Continued)

(58) Field of Classification Search
CPC ....... G06T 11/001; G06T 3/0093; G06T 7/11; G06T 7/194; G06T 2207/20081;
(Continued)

(56) References Cited

U.S. PATENT DOCUMENTS 7,149,665 B2 * 12/2006 Feld .................... G06T 17/00
703/2
8,208,722 B1 * 6/2012 Wolfram ............. G06T 15/04
382/167
(Continued)

FOREIGN PATENT DOCUMENTS

EP 3121793 A1 1/2017

OTHER PUBLICATIONS

International Search Report, dated Sep. 18, 2019, issued in International Application No. PCT/GB2019/051135.
(Continued)

*Primary Examiner* — Maurice L. McDowell, Jr.
(74) *Attorney, Agent, or Firm* — Saul Ewing Arnstein & Lehr LLP

(57) ABSTRACT

Disclosed is a computer-implemented method for providing photorealistic changes for a digital image. The method includes receiving a digital image of dressable model, receiving digital cutout garment textures that are indexed according to an outfitting layering order and aligned with body shape and pose of the dressable model, receiving binary silhouettes of the digital cutout garment textures, generating a garment layer index mask by compositing the binary silhouettes of the digital cutout garment textures indexed according to the outfitting layering order, receiving a composite image obtained by overlaying the digital cutout garment textures according to the indexed outfitting layering order on the digital image of the dressable model, inputting the composite image and the garment layer index mask into (Continued)

a machine learning system for providing photorealistic changes, and receiving from the machine learning system a digital file including photorealistic changes for application to the composite image.

23 Claims, 5 Drawing Sheets

(51) Int. Cl.
- *G06T 7/11* (2017.01)
- *G06N 20/00* (2019.01)
- *G06K 9/62* (2022.01)
- *G06Q 30/06* (2012.01)
- *G06T 3/00* (2006.01)

(52) U.S. Cl.
CPC ....... *G06Q 30/0643* (2013.01); *G06T 3/0093* (2013.01); *G06T 7/11* (2017.01); *G06T 7/194* (2017.01); *G06T 2207/20081* (2013.01); *G06T 2210/16* (2013.01)

(58) Field of Classification Search
CPC ..... G06T 2210/16; G06T 11/00; G06T 15/50; G06T 15/60; G06K 9/6256; G06N 20/00; G06Q 30/0643

See application file for complete search history.

(56) References Cited

U.S. PATENT DOCUMENTS

| | | | |
|---|---|---|---|
| 8,525,828 B1 | 9/2013 | Bates | |
| 8,674,989 B1 | 3/2014 | Toth et al. | |
| 10,540,757 B1* | 1/2020 | Bouhnik | G06K 9/00671 |
| 2005/0234782 A1* | 10/2005 | Schackne | G06Q 30/0601 |
| | | | 705/26.1 |
| 2020/0183969 A1* | 6/2020 | Wiesel | G06F 16/538 |

OTHER PUBLICATIONS

Creswell, Antonia, et al., "Generative Adversarial Networks: An Overview", arxiv.org, Cornell University Library, 201 Olin Library Cornell Univ. Ithaca, NY 14853, Oct. 19, 2017 XP081296319.

* cited by examiner

METHOD AND SYSTEM FOR PROVIDING PHOTOREALISTIC CHANGES FOR DIGITAL IMAGE

CROSS REFERENCE TO RELATED APPLICATIONS

This application claims the priority of PCT/GB2019/051135, filed on Apr. 23, 2019, which claims priority to GB Application No. GB1806685.2, filed on Apr. 24, 2018, the entire contents of each of which being fully incorporated herein by reference.

TECHNICAL FIELD

The present disclosure relates generally to image processing; and more specifically, to computer-implemented methods for providing photorealistic changes for a digital image. Moreover, the present disclosure relates to systems configured to provide photorealistic changes for a digital image. Furthermore, the present disclosure also relates to computer program products comprising non-transitory computer-readable storage media having computer-readable instructions stored thereon, the computer-readable instructions being executable by a computerized device comprising processing hardware to execute aforementioned methods

BACKGROUND

In recent years, digital commerce of goods, facilitated by digital commerce platforms, has increased exponentially, owing to quick and easy access thereto at any time and from any place. Typically, the digital commerce platforms allow consumers to purchase goods at convenience of their doorstep. Notably, the digital commerce platforms provide high quality digital images of goods so as to attract consumers thereto. Such digital images capture essential features associated with the goods thereby increasing likelihood of purchase thereof, and enhancing profitability of the digital commerce platforms.

However, capturing essential features associated with the goods in digital images thereof is a labour-intensive task, and requires a lot of time, effort and human intervention. For example, a digital commerce platform providing clothing items for transaction requires skilled personnel (such as photographers, models, lighting directors) for producing digital images for the clothing items. Typically, a clothing item (namely, a garment) is photographed either on a mannequin using a custom photography rig or on a model in a photoshoot. However, the digital commerce platform providing clothing items have hundreds of clothing items that require photographing. Therefore, the process of photographing each of the clothing items and further making them suitable for online merchandising requires considerable time and expense.

Recently, the digital commerce platforms have adopted a process known as composed model photography (CP) for producing digital images of the clothing items. In such case, digital image for a clothing item worn on a model is created artificially, using manual or semi-manual photo editing softwares. Such artificially created digital image for the clothing item substantially reduces cost of production thereof. Specifically, in the composed model photography process, a composite photograph is produced for the clothing item. Typically, the composite photograph is produced by transforming and aligning a photograph of the clothing item on a mannequin with a photograph of a model. Subsequently, the generated composite photograph undergoes a process of photo-realism so as to reproduce the composite photograph realistically. Notably, said process of photo-realism includes processes such as shadow synthesis, retouching, style transfer, and so forth. However, processing of the composite image for the clothing item, realistically, is a very skill-demanding and labour-intensive process. Typically, the photo-realism process requires skilled personnel (such as artists or graphics designers) with considerable expertise, to work for extensive periods of time for reproducing the composite image realistically. As a result, producing the digital image leads to low throughput, owing to a number of processes involved in generation thereof and intensive manual intervention.

It will be appreciated that plurality of such skilled personnel are required for producing realistic digital images for each of the hundreds of clothing items offered by the digital commerce platform. Subsequently, digital images produced by each of the skilled personnel may have varying quality depending on individual skill and expertise. Consequently, such varying quality of the digital images may result in loss of revenue owing to high quality threshold in such competitive markets associated with online merchandising.

Therefore, in light of the foregoing discussion, there exists a need to overcome the aforementioned drawbacks associated with the conventional methods for producing digital images realistically for the digital commerce platforms.

SUMMARY

The present disclosure seeks to provide a computer-implemented method for providing photorealistic changes for a digital image. The present disclosure also seeks to provide a system configured to provide a digital file including photorealistic changes for a digital image. The present disclosure also seeks to provide a computer program product executable to provide a digital file including photorealistic changes for a digital image. The present disclosure seeks to provide a solution to the existing problem of time-consuming and labor-intensive processes of generating photorealistic changes for digital images. An aim of the present disclosure is to provide a solution that overcomes at least partially the problems encountered in prior art, and provides a computer-implemented method for automated generation of photorealistic changes for digital images.

In one aspect, an embodiment of the present disclosure provides a computer-implemented method for providing photorealistic changes for a digital image, the method including steps of:

(i) receiving a digital image of a dressable model;

(ii) receiving one or more digital cutout garment textures, indexed according to an outfitting layering order, aligned with a body shape and a pose of the dressable model;

(iii) receiving binary silhouettes of the one or more digital cutout garment textures;

(iv) generating a garment layer index mask by compositing the binary silhouettes of the one or more digital cutout garment textures, indexed according to the outfitting layering order;

(v) receiving a composite image obtained by overlaying the one or more digital cutout garment textures, according to the indexed outfitting layering order, on the digital image of the dressable model;

(vi) inputting the composite image and the garment layer index mask into a machine learning system for providing photorealistic changes; and (vii) receiving from the machine learning system a digital file including photorealistic changes, suitable for application to the composite image.

In another aspect, an embodiment of the present disclosure provides a computer program product executable on a processor to provide a digital file including photorealistic changes for a digital image, the computer program product executable to:

(i) receive a digital image of a dressable model;

(ii) receive one or more digital cutout garment textures, indexed according to an outfitting layering order, aligned with the body shape and pose of the dressable model;

(iii) receive binary silhouettes of the one or more digital cutout garment textures;

(iv) generate a garment layer index mask by compositing the binary silhouettes of the one or more digital cutout garment textures, indexed according to the outfitting layering order;

(v) receive a composite image obtained by overlaying the one or more digital cutout garment textures, according to the indexed outfitting layering order, on the digital image of the dressable model;

(vi) input the composite image and the garment layer index mask into a machine learning system for providing photorealistic changes; and (vii) receive from the machine learning system a digital file including photorealistic changes, suitable for application to the composite image.

In yet another aspect, an embodiment of the present disclosure provides a system including a processor and a machine learning system, the processor configured to provide a digital file including photorealistic changes for a digital image, the processor configured to:

(i) receive a digital image of a dressable model;

(ii) receive one or more digital cutout garment textures, indexed according to an outfitting layering order, aligned with the body shape and pose of the dressable model;

(iii) receive binary silhouettes of the one or more digital cutout garment textures;

(iv) generate a garment layer index mask by compositing the binary silhouettes of the one or more digital cutout garment textures, indexed according to the outfitting layering order;

(v) receive a composite image obtained by overlaying the one or more digital cutout garment textures, according to the indexed outfitting layering order, on the digital image of the dressable model;

(vi) input the composite image and the garment layer index mask into the machine learning system for providing photorealistic changes; and (vii) receive from the machine learning system a digital file including photorealistic changes, suitable for application to the composite image.

In another aspect, an embodiment of the present disclosure provides a computer-implemented method for providing photorealistic changes for a digital image, in which a machine learning system is used to generate a digital file including photorealistic changes, suitable for application to a composite image, the composite image obtained by overlaying one or more digital cutout garment textures, according to an indexed outfitting layering order, on a digital image of a dressable model.

In yet another aspect, an embodiment of the present disclosure provides a computer program product executable on a processor to generate a file including photorealistic changes for a digital image, in which a machine learning system is used to generate a digital file including the photorealistic changes, suitable for application to a composite image, the composite image obtained by overlaying one or more digital cutout garment textures, according to an indexed outfitting layering order, on a digital image of a dressable model.

In another aspect, an embodiment of the present disclosure provides a system including a processor and a machine learning system, the processor configured to provide photorealistic changes for a digital image, in which the machine learning system is used to generate a digital file including photorealistic changes, suitable for application to a composite image, the composite image obtained by overlaying one or more digital cutout garment textures, according to an indexed outfitting layering order, on a digital image of a dressable model.

In yet another aspect, an embodiment of the present disclosure provides a computer-implemented method for providing photorealistic changes for a digital image, the method including the steps of:

(i) receiving a digital image of a dressable model;

(ii) receiving one or more digital cutout garment textures, including depth information, aligned with the body shape and pose of the dressable model;

(iii) receiving binary silhouettes of the one or more digital cutout garment textures;

(iv) receiving a composite image obtained by overlaying the one or more digital cutout garment textures ordered according to the depth information, and using the binary silhouettes, on the digital image of the dressable model;

(v) inputting the composite image, including the depth information, into a machine learning system for providing photorealistic changes; and (vi) receiving from the machine learning system a digital file including photorealistic changes, suitable for application to the composite image.

In another aspect, an embodiment of the present disclosure provides a computer program product executable on a processor to provide a digital file including photorealistic changes for a digital image, the computer program product executable to:

(i) receive a digital image of a dressable model;

(ii) receive one or more digital cutout garment textures, including depth information, aligned with the body shape and pose of the dressable model;

(iii) receive binary silhouettes of the one or more digital cutout garment textures;

(iv) receive a composite image obtained by overlaying the one or more digital cutout garment textures ordered according to the depth information, and using the binary silhouettes, on the digital image of the dressable model;

(v) input the composite image, including the depth information, into a machine learning system for providing photorealistic changes; and (vi) receive from the machine learning system a digital file including photorealistic changes, suitable for application to the composite image.

In yet another aspect, an embodiment of the present disclosure provides a system including a processor and a machine learning system, the processor configured to provide a digital file including photorealistic changes for a digital image, the processor configured to:

(i) receive a digital image of a dressable model;

(ii) receive one or more digital cutout garment textures, including depth information, aligned with the body shape and pose of the dressable model;

(iii) receive binary silhouettes of the one or more digital cutout garment textures;

(iv) receive a composite image obtained by overlaying the one or more digital cutout garment textures ordered according to the depth information, and using the binary silhouettes, on the digital image of the dressable model;

(v) input the composite image, including the depth information, into the machine learning system for providing photorealistic changes; and (vi) receive from the machine learning system a digital file including photorealistic changes, suitable for application to the composite image.

Embodiments of the present disclosure substantially eliminate or at least partially address the aforementioned problems in the prior art, and enables automated generation of photorealistic changes, thereby substantially decreasing time consumption and human-intervention is generation thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
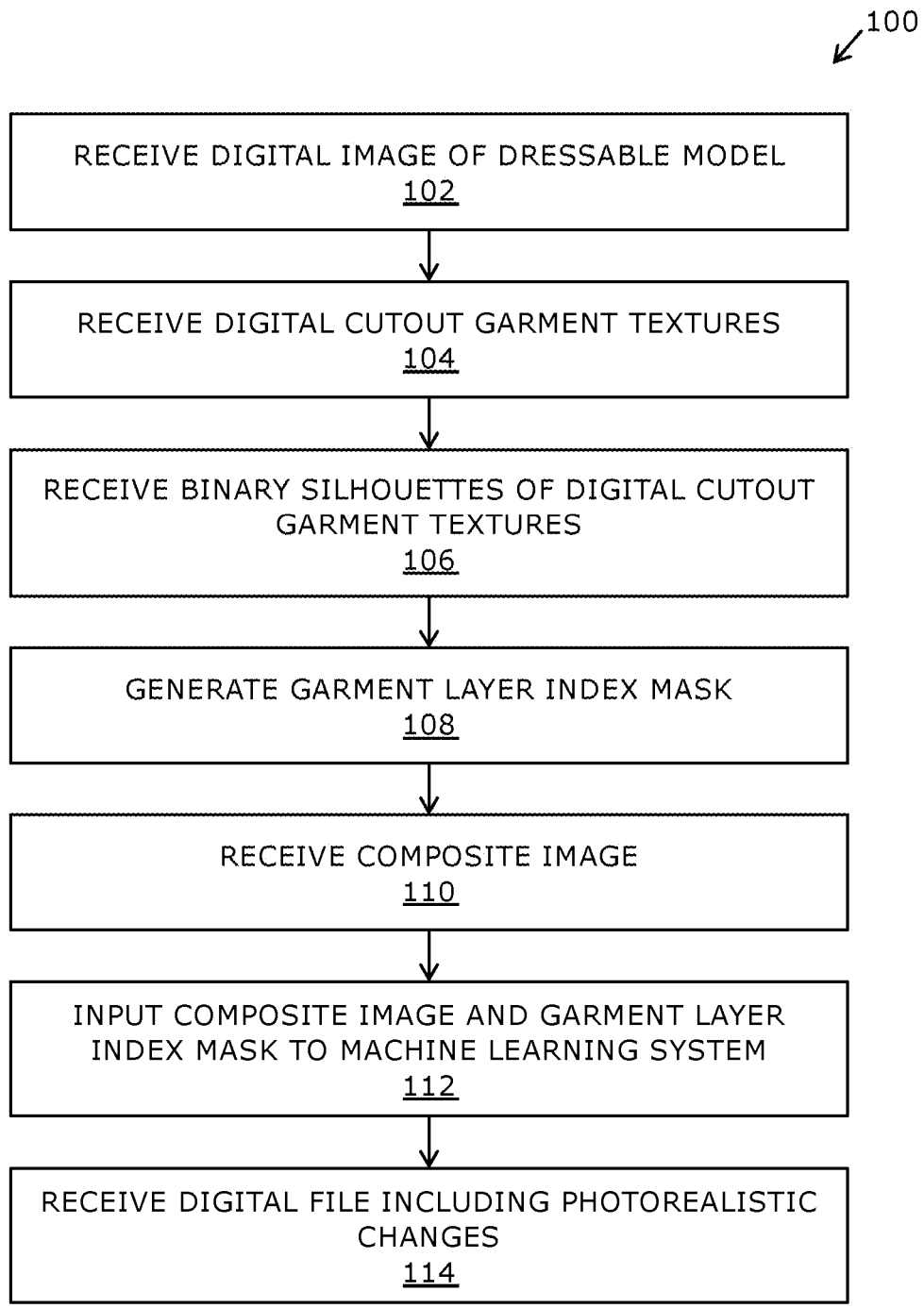
FIG. 1 illustrates steps of a computer-implemented method for providing photorealistic changes for a digital image, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a computer-implemented method for providing photorealistic changes for a digital image, the method including steps of:

(i) receiving a digital image of a dressable model;

(ii) receiving one or more digital cutout garment textures, indexed according to an outfitting layering order, aligned with a body shape and a pose of the dressable model;

(iii) receiving binary silhouettes of the one or more digital cutout garment textures;

(iv) generating a garment layer index mask by compositing the binary silhouettes of the one or more digital cutout garment textures, indexed according to the outfitting layering order;

(v) receiving a composite image obtained by overlaying the one or more digital cutout garment textures, according to the indexed outfitting layering order, on the digital image of the dressable model;

(vi) inputting the composite image and the garment layer index mask into a machine learning system for providing photorealistic changes; and (vii) receiving from the machine learning system a digital file including photorealistic changes, suitable for application to the composite image.

In another aspect, an embodiment of the present disclosure provides a computer program product executable on a processor to provide a digital file including photorealistic changes for a digital image, the computer program product executable to:

(i) receive a digital image of a dressable model;

(ii) receive one or more digital cutout garment textures, indexed according to an outfitting layering order, aligned with the body shape and pose of the dressable model;

(iii) receive binary silhouettes of the one or more digital cutout garment textures;

(iv) generate a garment layer index mask by compositing the binary silhouettes of the one or more digital cutout garment textures, indexed according to the outfitting layering order;

(v) receive a composite image obtained by overlaying the one or more digital cutout garment textures, according to the indexed outfitting layering order, on the digital image of the dressable model;

(vi) input the composite image and the garment layer index mask into a machine learning system for providing photorealistic changes; and (vii) receive from the machine learning system a digital file including photorealistic changes, suitable for application to the composite image.

In yet another aspect, an embodiment of the present disclosure provides a system including a processor and a machine learning system, the processor configured to provide a digital file including photorealistic changes for a digital image, the processor configured to:

(i) receive a digital image of a dressable model;

(ii) receive one or more digital cutout garment textures, indexed according to an outfitting layering order, aligned with the body shape and pose of the dressable model;

(iii) receive binary silhouettes of the one or more digital cutout garment textures;

(iv) generate a garment layer index mask by compositing the binary silhouettes of the one or more digital cutout garment textures, indexed according to the outfitting layering order;

(v) receive a composite image obtained by overlaying the one or more digital cutout garment textures, according to the indexed outfitting layering order, on the digital image of the dressable model;

(vi) input the composite image and the garment layer index mask into the machine learning system for providing photorealistic changes; and (vii) receive from the machine learning system a digital file including photorealistic changes, suitable for application to the composite image.

In another aspect, an embodiment of the present disclosure provides a computer-implemented method for providing photorealistic changes for a digital image, in which a machine learning system is used to generate a digital file including photorealistic changes, suitable for application to a composite image, the composite image obtained by overlaying one or more digital cutout garment textures, according to an indexed outfitting layering order, on a digital image of a dressable model.

In yet another aspect, an embodiment of the present disclosure provides a computer program product executable on a processor to generate a file including photorealistic changes for a digital image, in which a machine learning system is used to generate a digital file including the photorealistic changes, suitable for application to a composite image, the composite image obtained by overlaying one or more digital cutout garment textures, according to an indexed outfitting layering order, on a digital image of a dressable model.

In another aspect, an embodiment of the present disclosure provides a system including a processor and a machine learning system, the processor configured to provide photorealistic changes for a digital image, in which the machine learning system is used to generate a digital file including photorealistic changes, suitable for application to a composite image, the composite image obtained by overlaying one or more digital cutout garment textures, according to an indexed outfitting layering order, on a digital image of a dressable model.

In yet another aspect, an embodiment of the present disclosure provides a computer-implemented method for providing photorealistic changes for a digital image, the method including the steps of:

(i) receiving a digital image of a dressable model;

(ii) receiving one or more digital cutout garment textures, including depth information, aligned with the body shape and pose of the dressable model;

(iii) receiving binary silhouettes of the one or more digital cutout garment textures;

(iv) receiving a composite image obtained by overlaying the one or more digital cutout garment textures ordered according to the depth information, and using the binary silhouettes, on the digital image of the dressable model;

(v) inputting the composite image, including the depth information, into a machine learning system for providing photorealistic changes; and (vi) receiving from the machine learning system a digital file including photorealistic changes, suitable for application to the composite image.

In another aspect, an embodiment of the present disclosure provides a computer program product executable on a processor to provide a digital file including photorealistic changes for a digital image, the computer program product executable to:

(i) receive a digital image of a dressable model;

(ii) receive one or more digital cutout garment textures, including depth information, aligned with the body shape and pose of the dressable model;

(iii) receive binary silhouettes of the one or more digital cutout garment textures;

(iv) receive a composite image obtained by overlaying the one or more digital cutout garment textures ordered according to the depth information, and using the binary silhouettes, on the digital image of the dressable model;

(v) input the composite image, including the depth information, into a machine learning system for providing photorealistic changes; and (vi) receive from the machine learning system a digital file including photorealistic changes, suitable for application to the composite image.

In yet another aspect, an embodiment of the present disclosure provides a system including a processor and a machine learning system, the processor configured to provide a digital file including photorealistic changes for a digital image, the processor configured to:

(i) receive a digital image of a dressable model;

(ii) receive one or more digital cutout garment textures, including depth information, aligned with the body shape and pose of the dressable model;

(iii) receive binary silhouettes of the one or more digital cutout garment textures;

(iv) receive a composite image obtained by overlaying the one or more digital cutout garment textures ordered according to the depth information, and using the binary silhouettes, on the digital image of the dressable model;

(v) input the composite image, including the depth information, into the machine learning system for providing photorealistic changes; and (vi) receive from the machine learning system a digital file including photorealistic changes, suitable for application to the composite image.

The aforesaid computer-implemented method for providing photorealistic changes and the aforesaid system for providing photorealistic changes provides a platform to reproduce the digital image realistically. The system and method disclosed herein enables automated generation of the digital file including the photorealistic changes, thereby substantially decreasing human intervention in production thereof. Beneficially, the computer-implemented method can be implemented on conventional computing systems (for example, desktops, laptops, palmtops, and the likes) without upscaling thereof. Specifically, the computer-implemented method is executed to generate digital image that adds essential characteristic attributes associated with photo-realism to a composite image associated with the digital image, wherein the generated digital image is employed by digital commerce platforms for precise visual depiction.

Beneficially, the computer-implemented method described herein does not merely edits the digital image (for example, by applying an overall filter for the digital image) automatically, by employing photo editing tools but analyses precise characteristics associated with the digital image that needs to be modulated in order to reproduce the digital image realistically. Moreover, the computer-implemented method employs deep machine learning algorithms for training thereto, thereby reducing training time and complexity for training in real-time.

Specifically, the computer-implemented method employs machine learning algorithms to produce the digital file including the photorealistic changes for the digital image. Beneficially, the machine learning algorithms improves output of the computer implemented method (namely, accuracy of photorealistic changes) by significantly improving the quality of data samples generated, pertaining to analyzed composite image associated with the digital image. Moreover, the method described herein, employing the machine learning system, adapts to feedback provided by a user, thereby making the method more active and user-friendly.

It will be appreciated that the method for providing photorealistic changes for the digital image proffers a platform to achieve a technical effect of enabling automated reproduction of the digital image with precise photorealistic changes applied thereto. Moreover, the aforesaid system addresses real life hinderance associated with digital commerce platforms, owing to time-consuming and labor-intensive processes associated with generation of digital images for such digital commerce platforms so as to achieve the abovementioned technical effect. Additionally, the system enhances the operational characteristics of a computer. Typically, the computer-implemented method for providing the digital file including the photorealistic changes performs activities such as processing of the dressable model, generation of the garment layer index mask by compositing the binary silhouettes of the one or more digital cut-out garment textures, generation of the composite image, generation of the digital file including the photorealistic changes, and application of the digital file including the photorealistic changes onto the composite image to generate the corresponding realistic digital image, on the processor of the system. Notably, performance of the computer executing the computer-implemented method is optimized owing to optimal processing power utilized by the computer-implemented method.

Additionally, to achieve the technical effect stated above the system employs training of the machine learning system using machine learning algorithms. It will be appreciated that the system addresses a crucial drawback associated with the digital platforms for generating digital images having photorealistic changes and the use thereof, by providing the aforesaid platform for overcoming the labor-intensive and time-consuming processes associated thereto.

Furthermore, the use of the machine learning algorithms to train the machine learning system provides greater efficiency, enhanced runtime, and efficient utilization of resources and computational power. Moreover, the machine learning algorithms are trained using unsupervised learning techniques and semi-supervised learning techniques, so as to train the system efficiently, without employing large labeled training datasets and with optimal computational power.

It will be appreciated that the aforesaid method and the aforesaid system are not limited to produce the digital file including the photorealistic changes for only the digital image. The system and the method can be employed to produce digital file including photorealistic changes for each of multiple digital images received by the computer-implemented method. Moreover, the system and the method can be employed to produce digital file including photorealistic changes for each of multiple images received from various locations, or stored at various locations in a single database or in a plurality of databases. The database may comprise digital images obtained from one or more locations or digital images provided by one or more users, wherein the user is a person or a bot that operates the aforesaid system.

Throughout the present disclosure, the term "computer-implemented method" refers to methods whose implementation involves use of a computer, computer network, and other programmable apparatus associated with a digital system. Specifically, the computer-implemented method refers to a collection or a set of instructions executable by the computer or the digital system so as to configure the computer or the digital system to perform task that is the intent of the method. Optionally, the computer system and the digital system are adapted to allow for machine learning. Additionally, the computer-implemented method is intended to encompass such instructions stored in storage medium of the computer of the digital system, such as RAM, a hard disk, optical disk, or so forth, and is also intended to encompass "firmware" that is software stored on a ROM or so forth.

Pursuant to embodiments of the present disclosure, the computer-implemented method is employed for automatically enhancing photorealism of the digital images by generating a digital file including the photorealistic changes associated with the digital image. Specifically, the computer-implemented system automatically amends the digital image of for example, a garment worn by a body model or a mannequin to include photorealistic changes associated therewith.

Notably, the computer encompasses electronic devices used by a user that can enable the user to perform specific tasks associated with the aforementioned computer-implemented method. Optionally, the computer-implemented method is executable on any structure and/or module that include programmable and/or non-programmable components configured to store, process and/or share information. More optionally, the computer-implemented method involves use of data communication network for sharing of information. Examples of such networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks. Optionally, the computer executing the computer-implemented method includes any arrangement of physical or virtual computational entities capable of enhancing information to perform various computational tasks. Furthermore, it should be appreciated that the computer may be implemented as a single hardware or a plurality of hardware elements operating in a parallel or distributed architecture to perform the computer-implemented method. In an instance, the features of the claimed invention are realized by way of a computer program (namely, a software application).

Furthermore, the computer-implemented method is executed for providing photorealistic changes for the digital image. Throughout the present disclosure, the term "digital image" refers to a depiction recorded electronically for allowing viewing of subject or subjects in the depiction. Optionally, the digital image is a two-dimensional image (namely, an image having a height, and a width in two-dimensional space). More optionally, the digital image is a three-dimensional image (namely, an image having a height, a width, and a depth in the three-dimensional space). Optionally, the digital image comprises a plurality of picture elements (namely, pixels), wherein the pixels are organized in an ordered rectangular array.

Pursuant to embodiments of the present disclosure, the digital image comprises, for example, an image depicting a dressable model, an image depicting a garment dressed on a mannequin, an image depicting a garment on a model, an image depicting at least one garment, an image acquired from an external source (such as a website, an imaging device, an image database, and so forth), and a two-dimensional image derived from a three-dimensional image. Optionally, the digital image encompasses a still image, a video, an animated image, and an animated video. It will be appreciated that the video and the animated video are implemented by way of a number of image frames. Subsequently, for generating photorealistic changes associated with the video or the animated video, number of image frames are processed corresponding thereto.

Throughout the present disclosure, the term "photorealistic changes" refer to attributes or characteristic associated with the digital image, wherein the said photorealistic changes alter the digital image so as to reproduce thereto, realistically. Specifically, the photorealistic changes are features that are used to produce a realistic image from the digital image. Beneficially, such photorealistic changes enable accurate, detailed, and unembellished depiction of the digital image. Optionally, the photorealistic changes are one or more of: a shadow or shadows, a crease or creases, a scene background or scene backgrounds, a scene setting or scene settings, an animation or animations, or lighting adaption. Additionally, optionally, the photorealistic changes further enable style transfer and retouching of the digital image.

The present disclosure broadens the art of manipulating the digital image to include the photorealistic changes to make it possible for a computer executing the computer-implemented method to automatically carry out significant image manipulation processes which are beyond the abilities of human experts.

In an example, the digital image comprises a background body of a model and an overlaid garment. In such case, the photorealistic changes include, for example, artificial shadows between the background body of the model and the overlaid garment. Furthermore, the photorealistic changes comprise precise development of creases on the overlaid garment based on the body of the model. Additionally, the photorealistic changes comprise application of background setting and/or scene setting to the digital image. The photorealistic changes further include lighting adaptations associated with the digital file. Optionally, such lighting adaptation depend on the background setting of the photorealistic changes, scene setting of the photorealistic changes, and source of light in the digital file. Additionally, the lighting adaptation in the photorealistic changes further construes characteristics associated with light applied for such as white light, warm light, natural light, and so forth.

More optionally, the aforementioned photorealistic changes enhance a quality of the digital image, wherein the enhanced quality enable precise depiction of characteristics associated with the digital image. More optionally, the photorealistic changes further reduce noise associated with the digital image such as, for example, contrast, blur, saturation, brightness, artifact, distortion, spatial variation, visible grain, pixel level fluctuation, and so forth.

Furthermore, the computer-implemented method receives the digital image of a dressable model. Typically, the term "dressable model" refers to a representational figure of a person (namely, a model) of a proposed structure. The dressable model is depicted on a smaller scale for reproduction thereof, based on customized requirements of the user. The dressable model are divided into plurality of structures such as head, hands, torso, legs, and so forth. Such plurality of structures are replaced or overlaid by cut-out garment textures (as discussed in detail later, herein). In an example, the dressable model is selected by a user of the computer-implemented method. In another example, the computer-implemented method selects the dressable model based on, for example, predetermined selection criterion (as discussed later, herein).

Optionally, the digital image of a dressable model is selected based on a predetermined selection criterion or criteria. Notably, the term "predetermined selection criterion or criteria" of the dressable model refers to specific features associated with the dressable model. Examples of the predetermined selection criterion or criteria includes, but are not limited to, height of the dressable model, pose of the dressable model, body posture of the dressable model, figurative features associated with the dressable model (such as waist size, bust size, chest size, hip size, shoulder width, foot size, label size and so forth), a color (namely complexion) associated with the dressable model, a hairstyle of the dressable model, one or more identifying characteristics associated with the dressable model (such as, a body mark, a tattoo, a piercing, and so forth), a camera angle of the dressable model, and a background setting associated with the dressable model.

Additionally, optionally, the predetermined selection criterion or criteria may include a rank associated with the dressable model, wherein the rank defines (specifically, highlights) a distinguishing characteristic associated with the dressable model. In an example, a dressable model may be lean. Subsequently, the predetermines selection criterion or criteria defined in regard with a rank may rank the said dressable model highly so as to enable easy identification thereof, for an instance when a lean dressable model is to be selected. Moreover, optionally, the predetermined selection criterion or criteria is based on a garment to be overlaid on the dressable model.

Optionally, background regions and regions containing the undressed model or any garments or accessories (for example shoes) within the undressed model image are all indexed with the lowest layering order index value. Specifically, the digital image comprises a plurality of layers, wherein the plurality of layers separate different elements of the digital image. Such plurality of layers are stacked above each other so as to finally produce the digital image. Moreover, the computer-implemented method operates to identify layers corresponding to, for example, background regions in the digital image, regions containing the undressed model, regions containing features of the undressed model (for example, hair style, facial hair, tattoo, and so forth), regions containing accessory elements, region containing facial features, and so forth. The layer of the digital image corresponding the regions of the accessory elements may comprise, for example, regions with rings, regions with spectacles, regions with belts, regions with necklaces, regions with helmets, regions with shoes, and so forth.

Such plurality of layers of the digital image are indexed (namely, numbered) in accordance with, in an instance, a position of thereof. Notably, the term "lowest layering order index value" refers to a manner of indexing (namely, numbering) of the plurality of layers. In such case, indexing of the plurality of layers is started from a lowest layer. Consequently, in an example, an index value of '0' is allocated to a lowest layer (namely, a layer corresponding to a background region of the digital image). An index value of '1' is allocated to a layer corresponding to a region containing an undressed model or a body of the dressable model. An index layer of '2' is allocated to a layer corresponding to a region containing features associated with the undressed model or the body of the dressable model. An index value of '3' is allocated to a layer corresponding to a region containing accessory elements (for example, shoes, belts, and so forth).

Optionally, the computer-implemented method generates or receives a binary mask of the digital image of the dressable model. It will be appreciated that a binary mask of the digital image of the dressable model comprises of plurality of binary pixels, wherein the plurality of binary pixels has only two possible values. Optionally, the two values for the binary mask implemented using the plurality of binary pixels are '0' and '1'. In such case, the '0' denotes a 'black' color and the '1' denotes a 'white' color. More optionally, a plurality of binary pixels in the binary mask of the digital image of the dressable model comprises a set of pixels depicting the dressable model and a set of pixels depicting a background. In an example, the set of pixels depicting the background have a value '0' denoting a 'black' color and the set of pixels depicting the dressable model have a value '1' denoting a 'white' color. In another example, the set of pixels depicting the background have a value '1' denoting a 'white' color and the set of pixels depicting the dressable model have a value '0' denoting a 'black' color.

Furthermore, optionally, the received digital image of the dressable model is one in which the dressable model has been separated from a background. Specifically, in such case, the regions comprising the background is removed from the digital image of the dressable model. Optionally, the layer containing the background region is removed from the digital image of the dressable model so as to separate the background. More optionally, a body of the dressable model is cropped out from the digital image thereof so as to separate the background.

Furthermore, the computer-implemented method comprises receiving one or more digital cutout garment textures, indexed according to the outfitting layering order, aligned with the body shape and pose of the dressable model. Typically, the term "one or more digital cutout garment textures" refers to different pieces (namely, cutouts) of garments in a digital image depicting collective panorama of a distinctive appearance (namely, a style). It will be appreciated that the distinctive appearance is implemented using the one or more cutouts of the garments. Furthermore, the one or more digital cutout of the garments depicts a texture of a garment corresponding thereto. Optionally, the one or more digital cutout garment texture is extracted from a digital image of a distinctive appearance or a digital image of a garment, by manipulation thereof.

More optionally, each of the one or more digital cutout garment textures is generated by separating or cutting out a garment in a foreground of the image from a garment image background. Specifically, the manipulation of the digital image of the distinctive appearance or the digital image of the garment includes separation or cutout of parts (namely, sections) of the distinctive appearance or the garment in foreground of the digital image to extract the one or more digital cutout garment textures. It will be appreciated that such manipulation of the digital image of the distinctive appearance or the digital image of the garment may be performed automatically by the computer-implemented method or may be performed manually by a user executing the computer-implemented method or a photo-editing software.

Alternatively, optionally, the received one or more digital cutout garment textures require no manipulation. In such case, the one or more digital cutout garment texture need not be manipulated (namely, edited) for extraction thereto from a digital image thereof. Subsequently, the received one or more digital cutout garment textures are directly aligned with the body and pose of the dressable model.

In a first example, the one or more digital cutout garment textures extracted from a digital image of a distinctive appearance includes a cutout of a cap, a cutout of a top, a cutout of jeans, and a cutout of shoes. In a second example, the one or more digital cutout garment textures extracted from a digital image of a garment worn on upper body (namely, a top) includes a cutout of a right sleeve, a cutout of a left sleeve, a cutout of a neckline, a cutout of a part covering the torso.

Furthermore, the one or more digital cutout garment texture is indexed (namely, numbered) according to the outfitting layering order. Specifically, the outfitting layering order describes a sequence of arrangement of the one or more digital cutout garment textures on the dressable model. In the first example, the cutout of shoes have an outfitting layering order '1', the cutout of the jeans have an outfitting layering order '2', the cutout of the top have an outfitting layering order '3', and the cutout of the cap have an outfitting layering order '4'. Subsequently, the one or more digital cutout garment textures are positioned based on the outfitting layering order on the dressable model.

The one or more digital cutout garment textures positioned on the dressable model based on the outfitting layering order are aligned with the body shape and pose of the dressable model. Specifically, the term "body shape" refers to external form, contours, or outline of the body of the dressable model. Moreover, the term "pose" refers to a positional depiction (for example, posture of the body, position of hands, position of legs, and so forth) of the dressable model. Furthermore, the one or more cutout garment textures are aligned with the body shape and the pose of the dressable model so as to generate a digital image depicting one or more digital cutout garment textures on the body of the dressable model (namely, the composite image). Optionally, the one or more digital cutout garment textures are transformed or warped to match or align with the body shape and pose of the dressable model.

In the first example, the cutout of shoes having outfitting layering order '1' is aligned with feet of the dressable model, the cutout of the jeans having outfitting layering order '2' is aligned with legs of the dressable model, the cutout of the top having outfitting layering order '3' is aligned with torso and hands of the dressable model, and the cutout of the cap having outfitting layering order '4' is aligned with head and hair of the dressable model.

Moreover, optionally, the received one or more digital cutout garment textures are obtained from a database. Specifically, the term 'database' as used herein refers to an organized body of digital information regardless of the manner in which the data or the organized body thereof is represented. Optionally, the database may be hardware, software, firmware and/or any combination thereof. The data stored in the database may be in the form of a table, a map, a grid, a packet, a datagram, a file, a document, a list, and so forth. The database includes any data storage software and systems, such as, for example, a relational database like IBM DB2 and Oracle 9. Moreover, optionally, the database may further comprise a database management system, wherein the database management system is operable to manage one or more databases. Pursuant to embodiments of the present disclosure, the database may store the one or more digital cutout garment textures for application thereof on the dressable model.

The computer-implemented method includes the step of receiving binary silhouettes of the one or more digital cutout garment textures. Specifically, silhouettes of the one or more digital cutout garment textures are generated using the one or more digital cutout garment textures, wherein the silhouettes depict an outline of the one or more digital cutout garment textures without depicting any feature associated thereto. Typically, such silhouettes refer to an object or a set of objects, wherein the object or the set of objects have relatively high intensity when viewed against a background of relatively low intensity. The silhouettes allow ground separation of the one or more digital cutout garment textures from the dressable model. Subsequently, properties associated with two-valued binary images are applied to the silhouettes to generate the binary silhouettes of the one or more digital cutout garment textures. Therefore, a digital image depicting the binary silhouette is classified into foreground and background, wherein the foreground and the background has a definite binary value associated thereto. In an example, the binary silhouette is constructed such that pixels having a binary value '1' depicting 'white' color are foreground (namely, the binary silhouette of the one or more digital cutout garment textures) and pixels having a binary value '0' depicting 'black' color are background.

Optionally, each binary silhouette is generated by extracting and thresholding alpha channel of a respective digital cutout garment texture. It will be appreciated that pixels comprise information pertaining to color (namely, red, blue and green), in addition to an alpha attribute that determines opacity of the pixels.

Specifically, a binary silhouette is generated for each of the one or more digital cutout garment textures. More specifically, a binary silhouette corresponding to a digital cutout garment texture is generated by extracting and thresholding an alpha channel of the digital cutout garment texture. Notably, the alpha channel adds an alpha attribute to pixels of the digital cutout garment texture. Subsequently, the alpha attribute of the pixels of the digital cutout garment texture is thresholded so as to obtain the binary silhouette of desirable opacity. In an embodiment, a value of the alpha attribute may range from '0' for transparent area to '255' for opaque area. In such case, pixels of the digital cutout garment texture are thresholded to a '128' value of alpha attribute to obtain a binary silhouette of 50 percent visibility.

The computer-implemented method includes step of generating a garment layer index mask by compositing the binary silhouettes of the one or more digital cutout garment textures, indexed according to the outfitting layering order. Specifically, each of the binary silhouette corresponding to the one or more digital cutout garment texture is composted (namely, combined) to form the garment layer index mask. Such compositing of the binary silhouette is done based on indexed outfitting layering order of the one or more digital cutout garment textures. In other words, based on a sequence described for the outfitting layering order of the one or more digital cutout garment texture, the binary silhouette corresponding to the one or more digital cutout garment textures are placed so as to form the garment layer index mask. Optionally, the garment layer index mask is generated manually by the user of the computer-implemented method or automatically by the computer-implemented method.

Optionally, the one or more cutout garment textures may be acquired from different locations. For example, a digital image for a top may be stored in a first database, a digital image of jeans may be stored in a second database, a digital image of shoes may be acquired from an image processing device, and so forth. Subsequently, binary silhouette corresponding to each of the one or more cutout garment textures is generated using thereto, and may be stored at different locations. The computer-implemented operates to combine the generated binary silhouette stored at different locations, for example, stored in different files on a computer implementing the computer-implemented method. Specifically, the one or more digital cutout garment textures are indexed with an outfitting layering order such that the outfitting layering order is defined in accordance with a collaborative depiction of the one or more cutout garment textures stored at various locations. Furthermore, the indexed value of the outfitting layering order of the one or more cutout garment textures stored at various locations is used to compost the binary silhouette corresponding thereto, to form the garment layer index mask therefor.

In accordance with the first example, a binary silhouette corresponding to the cutout of shoes having outfitting layering order '1' is positioned as most inside layer a garment layer index mask thereof, followed by a binary silhouette corresponding to the cutout of the jeans having outfitting layering order '2', followed by a binary silhouette corresponding to the cutout of the top having outfitting layering order '3', further followed by a binary silhouette corresponding to the cutout of the cap having outfitting layering order '4' positioned as most outside layer of the garment layer index mask.

The garment layer index mask M conveys important spatial information that guides the machine learning algorithm on how and where to precisely render photo realistic features such as synthetic shadows, shading or creases and in which direction such features (for example synthetic shadow) should be added (for example, an outer-layer garment would cast a shadow onto an inner-layer garment at the boundary of the two garments and not vice versa).

Optionally, the garment layer index mask conveys important spatial information that guides the machine learning system (as discussed in detail later, herein) on how and where to precisely render photorealistic features (for example, synthetic shadow or shadows, shading, or crease or creases). Specifically, the garment layer index mask provides information related to precise location wherein the photorealistic changes are to be applied in the digital image to reproduce thereto realistically. In an example, the spatial information is provided in terms of a location of pixels to be modulated to render the photorealistic changes.

More optionally, the garment layer index mask conveys important spatial information that guides the machine learning system on, in which direction such photo realistic features should be added. In an example, the photorealistic changes correspond to synthetic shadow between an inner-layer garment and an outer-layer garment, to be applied to the digital image. In such case, the garment layer index mask comprising the composted binary silhouettes describes location (namely, spatial information) corresponding to pixels of a boundary of the two garments, so as to represent the synthetic shadow casted by the outer-layer garment onto the inner-layer garment.

The computer-implemented method includes a step of receiving the composite image obtained by overlaying the one or more digital cutout garment textures, according to the indexed outfitting layering order, on the digital image of the dressable model. Typically, the one or more digital cutout garment textures from the digital image of the garment and the digital image of the dressable model are assembled to form the composite image. Moreover, the one or more digital cutout garment textures are positioned based on a value of outfitting layering order associated thereto. In an instance, the composite image is received from the user of the computer-implemented method. In another instance, the composite image is received (namely, downloaded) from an external source such as a website, a database, and the likes.

Optionally, the received composite image is generated by overlaying the one or more digital cutout garment textures, according to the indexed outfitting layering order, on the digital image of the dressable model. Specifically, the computer-implemented method operates to generate the composite image by overlaying the one or more digital cutout garment textures acquired from digital image of the garment onto the body of the dressable model acquired from the digital image of the dressable model. It will be appreciated that the one or more digital cutout garment textures is aligned in accordance with the body and pose of the dressable model to generate the composite image.

The computer-implemented method includes step of inputting the composite image and the garment layer index mask into the machine learning system for providing photorealistic changes. Specifically, the machine learning system refers to a system comprising programmable and/or non-programmable components configured to execute one or more software applications employing machine learning algorithms. Optionally, the machine learning system includes a machine learning module (for example a deep neural network based on Cascade Refinement Network (CRN) or Generative Adversarial network (GAN)). Notably, the "machine learning algorithms" refer to a category of algorithms employed by the one or more software applications that allows the one or more software applications to become more accurate in predicting outcomes and/or performing tasks, without being explicitly programmed. Typically, the one or more software applications are a set of instructions executable by the machine learning system so as to configure the computer-implemented method to generate photorealistic changes associated with the digital image. Specifically, the machine learning algorithms are employed to artificially train the software applications so as to enable them to automatically learn, from analyzing training dataset and improving performance from experience, without being explicitly programmed.

Optionally, the computer-implemented method includes a step of in which the machine learning system is trained. The machine learning algorithms, employed by the one or more software applications of the machine learning system, are trained using a training dataset. More optionally, the machine learning algorithms employed by the one or more software applications may vary, based on training dataset employed for training thereof. Examples of the different types of the machine learning algorithms base of the training dataset employed thereby comprise, but are not limited to: supervised machine learning algorithms, unsupervised machine learning algorithms, semi-supervised learning algorithms, and reinforcement machine learning algorithms. Furthermore, the machine learning system is trained by interpreting patterns in the training dataset and adjusting the machine learning algorithms accordingly to get a desired output. More optionally, the computer-implemented method includes a step in which to train the machine learning system at least 1,000 images are used. It will be appreciated that the at least 1,000 images comprise a training dataset for training of the machine learning system.

In an embodiment, the computer-implemented method employs unsupervised learning techniques to train the machine learning system. Training dataset employed for training the machine learning system using the unsupervised learning techniques are unlabeled or unstructured. Specifically, the training dataset employed for training the machine learning system using unsupervised learning techniques is neither classified nor labeled. More specifically, the unsupervised learning techniques employed for training the machine learning system does not train the machine learning system with a desired output. In such case, the training dataset comprising the at least 1,000 images are unlabeled. Subsequently, photorealistic changes associated with the at least 1,000 images employed as training dataset is not provided to the machine learning system. In an example, the training dataset includes a set of real images and a set of composite images. The machine learning system trains thereto to analyze features associated with the set of real images and the set of composite images and further generate photorealistic changes for the set of composite images in accordance with features associated with the set of real images. Optionally, unsupervised learning techniques operate by combining substantially large examples of training datasets to train the machine learning system. More optionally, the unsupervised machine learning algorithms may create a data bank so as to store an interpretation or analysis relating to the training dataset provided for training the machine learning system. Furthermore, the unsupervised machine learning algorithms may refer the data bank to determine photorealistic changes for inputted composite image or to analyze a new training dataset. Beneficially, the unsupervised learning techniques employ unlabeled training dataset thereby saving time required for labelling the dataset.

Furthermore, optionally, examples for unsupervised machine learning algorithms employed for unsupervised learning of an inherent structure relating to the training dataset, without using explicitly-provided labels are, but not limited to: k-means clustering, k-NN, Dimensionality Reduction, Singular Value Decomposition, Distribution models, Hierarchical clustering, Mixture models, Principal Component Analysis, and autoencoders.

In another embodiment, the computer-implemented method employs supervised learning techniques to train the machine learning system. Specifically, training dataset employed for supervised learning of the machine learning system is labeled or structured. More specifically, the machine learning system predict photorealistic changes for a given composite image by learning from the labeled training datasets, wherein the labeled training datasets comprise desirable photorealistic changes for composite images associated therewith. Furthermore, optionally, the training dataset comprising the at least 1,000 images are labeled. Subsequently, desirable photorealistic changes associated with the at least 1,000 images employed as training dataset is provided to the machine learning system. In an example, the training dataset includes a set of composite images and a set of photorealistic changes corresponding to each of the set of composite images. In another example, the training dataset includes a set of photorealistic changes, wherein the photorealistic changes are labeled based on a type of photorealistic change, a position where the photorealistic change is to be applied, a light adaptation associated with the photorealistic change, and so forth. In a preferred implementation, 2166 existing manual-authored composite images data are used as the training dataset to train the machine learning algorithm of the machine learning system.

Optionally, the supervised machine learning algorithms analyze the labeled training dataset so as to interpret the labeled training dataset. Typically, the labeled training dataset comprises a desired output. Moreover, the labeled training dataset enables the machine learning system to derive feedback pertaining to accuracy of output (namely, accuracy of photorealistic changes) generated by the machine learning system, during training. In other words, the supervised learning enables an instructor (such as, a human and/or a bot) to train the machine learning system by providing labeled training dataset and further providing a feedback pertaining to the accuracy of the output generated by the machine learning system.

Optionally, the machine learning system may compare output generated by the machine learning system with desired output provided as feedback, by referencing the labeled training dataset. Moreover, upon finding any error, the machine learning system modify thereto accordingly. Furthermore, optionally, upon the completion of supervised learning of the machine learning system, the machine learning system apply the interpretation derived from the labeled training dataset to determine photorealistic changes for the inputted composite image.

In yet another embodiment, the computer-implemented method employs semi-supervised learning techniques to train the machine learning system. Specifically, the training dataset employed for semi-supervised learning of the machine learning system is divided into two sets, wherein a first set of the training dataset is labeled training dataset and a second set of the training dataset is unlabeled training dataset. More specifically, the labeled training dataset comprises a small corpus of labeled data for supervised training of the machine learning system. Furthermore, the unlabeled training dataset comprises a comparatively large amount of unlabeled data for unsupervised training of the machine learning system. Beneficially, semi-supervised learning techniques significantly improves the quality of generated output and reduces training times for the machine learning system.

Optionally, the computer-implemented method generates ground truth "diff" shadow image by subtracting a final composed image from an intermediate composed image obtained after overlaying one or more digital cutout garment textures, according to an indexed outfitting layering order, on a digital image of a dressable model, for training the machine learning system. In a preferred implementation, the computer-implemented method uses automated scripts to generate the training datasets. In such case, the computer-implemented method parses stored data profiles of photo-editing tools (for example PSD files for Photoshop) to obtain final composed image and/or intermediate composed image. It will be appreciated that upon obtaining only the final composed image, the computer-implemented method may generate intermediate composed image therefor by overlaying one or more digital cutout garment textures of the final composed image, according to an indexed outfitting layering order, on a digital image of a dressable model of the final composed image. Moreover, the computer-implemented method automatically extracts required data (namely, the final composed image and/or the intermediate composed image) to comprise the training dataset from the parsed data profiles. Additionally, the computer-implemented transform the extracted data to obtain the required input-output pairs needed for model training. Specifically, the extracted data is transformed by subtracting the final composed image from the intermediate composed image and transforms the extracted data to obtain the required input-output pairs needed for model training. More specifically, an output obtained from the subtraction of the final composed image from the intermediate composed image refers to the ground truth "diff" shadow image, wherein the ground truth "diff" shadow image comprises training dataset for photorealistic changes.

The garment layer index mask is provided as a training input to train the machine learning system employed by the computer-implemented method. Beneficially, providing the garment layer index mask as input into the machine learning system yields a greater than 25% perception loss reduction in the final image output, wherein the final image output comprises photorealistic changes applied thereto. Subsequently, the reduction in perception loss enables the machine learning system to enhance run-time thereof, owing to easy and quick identification of similar or same images. Typically, the machine learning system identifies features of the images (namely, garment layer index mask associated thereto) so as to identify similar of same images.

Moreover, optionally, the machine learning system employs autoencoders, image classifiers, and so forth to train thereto, using the garment layer index mask. In an example, the machine learning system employs autoencoder model. It will be appreciated that the autoencoder consists of two parts, namely, an encoder and a decoder. Furthermore, a given image in a training dataset is an image 'A' of a man having a 'B' body, a 'P' pose, and having an 'X' background. The autoencoder model takes the image 'A' of the man and learns to produce other images that is substantially similar to the image 'A'. Subsequently, the autoencoder model analyzes features associated with the image 'A' thereby enhancing output data.

In the autoencoder model, the encoder is operable to analyze the image 'A' to determine features associated therewith. Furthermore, the decoder analyzes the other images produced by the encoder so as to recreate the image 'A' therefrom. Specifically, the decoder tries to learn from the other images produced by the encoder, with minimum recreation error. Furthermore, optionally, upon the training of the autoencoder model on a training dataset, the decoder is chopped off.

Furthermore, optionally, the composite image generated by overlaying the one or more digital cutout garment textures, according to the indexed outfitting layering order, on the digital image of the dressable model (namely, an intermediate composite image) and the garment layer index mask are inputted to the machine learning system, wherein the machine learning system is trained previously using the training dataset.

In an implementation, the machine learning module or the machine learning system is trained by employing a generator-adversarial network. Typically, the generator-adversarial network trains the machine learning system using machine learning algorithms to create digital files including random photorealistic changes similar and/or dissimilar to a digital file comprising desired photorealistic changes. Furthermore, the generator-adversarial network trains the machine learning algorithms of the machine learning system to learn from the digital files including random photorealistic changes.

It will be appreciated that the generator-adversarial network is implemented by way of a generator neural network and a discriminator neural network. The generator neural network, employing generative algorithms, create new data instances. In other words, the generator neural network creates the digital files including random photorealistic changes by analyzing features relating to digital images provided as the training dataset. Furthermore, the discriminator neural network employing discriminative algorithms evaluate the new data instances. In other words, the discriminator neural networks analyze the digital files including random photorealistic changes so as to, for example, assign a similarity score to them. In such case, the discriminator neural networks assign a number (namely, similarity score) between 0 and 1 to the digital files including random photorealistic changes generated by the generator neural network, with 1 representing a prediction of similarity and 0 representing dissimilarity. Moreover, optionally, the discriminator provides feedback to the generator pertaining to the evaluated similarity score. Consequently, the generator may generate more random sentence coordinates belonging a desired category (such as, similar to training dataset or dissimilar to training dataset).

In another implementation, machine learning module or the machine learning system is trained by employing a cascade refinement network. Optionally, the machine learning system includes a modified and repurposed version of the cascade refinement network (CRN). It will be appreciated that the CRN is implemented using machine learning algorithms. Specifically, the cascade refinement network is implemented by way of a plurality of convolution layers connected by way of a cascade connection. Optionally, each of the plurality of layers in the CRN operates at a given resolution. In an example, a resolution of a first layer from the plurality of layers is lowest. In such case, a resolution of successive layer is doubled. Pursuant to embodiments of the present disclosure, the CRN is implemented by way of a cascade of 'N' convolution layers. Subsequently, optionally, a resolution of operation of the 'N' convolution layers increases with increase in a number of convolution layer. Therefore, the machine learning algorithms are trained so as to generate photorealistic changes corresponding to each of images provided as training dataset thereto. Photorealistic changes generated by a first layer of the CRN is provided to a second layer, for refinement thereof. This process of refinement of the photorealistic changes continues to an Nth layer of the CRN. Final refined photorealistic changes for each of the images in the training dataset, generated by the Nth layer of the CRN is stored so as to training the machine learning algorithms of the CRN. The machine learning algorithms of the CRN implement training thereof, for generation of photorealistic changes corresponding to the composite image provided thereto by the computer-implemented method.

Optionally, in the CRN, synthesis (namely, processing of input for generation of output) begins at extremely low resolution (for example, an input image having a resolution of 4 pixels×4 pixels). Subsequently, features corresponding to low resolution image is analyzed at lower layers of the CRN. Such features are progressively refined with increase in layers. Beneficially, global structure can be coordinated at lower octaves, where even distant features are represented in nearby columns. These decisions are then refined at higher octaves to obtain accurate results for photorealistic changes. More optionally, increasing an octave in resolution (e.g., from 512 pixels×512 pixels to 1024 pixels×1024 pixels) amounts to adding a single convolution layer in the CRN. Therefore, entire cascade of the plurality of convolution layers is trained end-to-end.

Optionally, the machine learning system uses a cascade refinement network (CRN) containing a cascade of N convolutional layers blocks working at low spatial resolutions to high spatial resolutions, in which lowest resolution version of input image $L_0$ is fed into first layer block (block 1); feature output Fi of each layer block i (i=1, 2, . . . N−1) of resolution 'r' are upsampled and then combined with inputs $L_{i+1}$ scaled at working resolution '2r' of layer block i+1 to be passed as input of next layer block i+1 in the cascade, and repeated up to last layer block (block N) of the network, which generates the digital file including photorealistic changes. Specifically, the machine learning system uses a cascade refinement network (CRN) containing a cascade of N convolutional layer blocks working at low spatial resolutions to high spatial resolutions for generation of the digital file including photorealistic changes for the digital image. In an implementation, the lowest resolution version (namely, 'L0') of the input image is fed into first layer block (namely, block 1 of the cascade of N convolutional layers). Typically, the input image refers to the composite image generated by overlaying the one or more digital cutout garment textures, according to the indexed outfitting layering order, on the digital image of the dressable model with/without the garment layer index mask. Subsequently, an output of the first layer block (namely, feature output 'F0'), having a resolution 'r', is upsampled. The upsampled output of the first layer block is combined with input image for a second layer block, wherein the input image for the second layer block refers to the input image having a scaled resolution '2r'. The upsampled output of the first layer block combined with the input image for a second layer block is fed into the second layer block (namely, block 2 of the cascade of N convolutional layers). Similarly, the process of refinement is carried of each layer block of the cascade of N convolutional layers to obtain the digital file including photorealistic changes as an output of the last layer block (namely, block N of the cascade of N convolutional layers).

Moreover, optionally, the training of the machine learning system includes a multi-stage iterative training process wherein the machine learning system is initially trained using a model for low-resolution-images, and then is gradually re-trained or fine-tuned for greater image resolutions through weight-sharing to produce a training model. In an example implementation, the machine learning algorithms of the CRN are first trained using low-resolution images in the training dataset followed by re-training thereof, using high-resolution images in the training dataset. It will be appreciated that the training dataset may comprise the low-resolution images and the high-resolution images or the computer-implemented method operates to convert the low-resolution images and into high-resolution images. Subsequently, as mentioned previously, the machine learning algorithms of the CRN, initially, analyzes features of the low-resolution images to assign a weight thereto. Optionally, weights associated with features of the images is at least one of: an alphabetic value, a numeric value, an alpha-numeric value. For example, the CRN is trained using a set of images having a first resolution (256 pixels×256 pixels) for 60 epochs, followed by training thereto using a set of images having a second resolution (512 pixels×512 pixels) for 40 epochs, further followed by training thereto using a set of images having a third resolution (1024 pixels×1024 pixels) for 30 epochs. It will be appreciated that 'one epoch' refers to a unit of time in which a training dataset is passed through each of the N convolution layers of the machine learning algorithms of the CRN. It will be appreciated that weights corresponding to features, determined by the convolution layers (or the convolution layer blocks) of the CRN are updated at an end of each epoch thereby training the CRN gradually.

Furthermore, optionally, a channel-stacked image provides unified inputs Li (i=1, 2, ... N) into the CRN, wherein the channel-stacked image is a consolidated image that combines the garment layer index mask input with the undressed body image and a body mask. Notably, the channel stacked image refers to image, having plurality of layers, wherein the plurality of layers of the image are stacked (namely, layered over one another) based on a channel (namely, color) of ach of the plurality of layers. It will be appreciated that an RGB image will have three channels (namely, a red channel, a blue channel, and a green channel).

Subsequently, the channel stacked image provides unified inputs to the plurality of convolution layers of the CRN such that the unified inputs describe information pertaining to each of the channels of the image. Optionally, channel stacked images may be used as training datasets for training of the machine learning algorithms. More optionally, for CRN training, the channel-stacked image is scaled to different resolution to be fed as an input Li to each convolution layer (i=1, 2, ... , N) of the CRN.

In an example, two versions of channel-stacked images are used alongside each other:

(a) K+3 channel version, which includes 3-channel of RGB no-shadow images, and K-channel of one-hot encoded garment layer index mask images, wherein all source images are normalized to same size, and (b) K+8 channel version, which include 3-channel of the RGB no-shadow images, K-channel of the one-hot encoded garment layer index mask images, 3-channel of the undressed model photos, and a 1-channel binary body mask.

In an alternate example, two versions of channel-stacked images are used alongside each other:

(a) K+3 channel version, which include 3-channel of RGB no-shadow images, and K-channel of one-hot encoded garment layer index mask images, wherein all source images are normalized to same size, and (b) K+8 channel version, which include 3-channels of the RGB no-shadow images, K-channels of the one-hot encoded garment layer index mask images, 3-channels of the undressed model photos, and a 1-channel binary body mask generated from an undressed model photo using an automatic image segmentation algorithm.

Notably, aforementioned term "RGB no-shadow images" refer to images that do not have photorealistic changes applied thereto. Subsequently, the RGB no-shadow images are composed images without photorealistic changes applied thereto. Moreover, "one-hot encoded garment layer index mask image" refers to hot-encoded garment layer index mask image of the one or more digital cutout garment textures. Specifically, the garment layer index mask image is one-hot encoded so as to represent the categorical class labels of the index mask image into a dimensional vector. Pursuant to embodiments of the present disclosure, the index mask image comprises 'K' number of categorical class labels Subsequently, the 'K' categorical class labels are represented into a K-dimensional vector, where k-th dimension (k=1, 2, ... , K) of the K-dimensional vector is '1' and all other dimensions are '0'.

Subsequently, the plurality of convolution layers of the CRN may be trained using the channel stacked image, wherein two versions of the channel stacked image are employed alongside for training thereof. A first version of the channel stacked image belongs to 'K+3' version, and a second version of the channel stacked image belongs to 'K+8' version. Moreover, optionally, the binary body mask generated from a digital image of dressable model may be obtained using the automatic image segmentation algorithm or using an interactive cutout tool (e.g. Photoshop Magic Wand).

It will be appreciated that in the 'K+3' version of channel stacked images, the 3 channels are color channels (namely, red channel, blue channel, and green channel) of a composed image, and the K channels belong to K-dimensional representation of the garment layer index mask image. Furthermore, in the 'K+3' version of channel stacked images, the 3 channels are color channels (namely, red channel, blue channel, and green channel) of a composed image, 3 channels are channels of digital image of the dressable model, 1 channel is a channel of binary mask of digital image of the dressable model, and 1 channel is an alpha-channel. Moreover, the K channels belong to K-dimensional representation of the garment layer index mask image.

Furthermore, optionally, subsequent image training inputs are used to improve prediction quality of the machine learning system. specifically, prediction quality refers to an accuracy of output of the machine leaning system to correctly identify photorealistic changes for the provided composite image and/or the digital image.

Notably, the subsequent image training inputs include one or more of: an undressed model image (namely, the digital image of the dressable model); an undressed model image in format of a three channel RGB image (namely, a channel stacked image of the digital image of the dressable model); a body mask including a binary foreground and background segmentation of the undressed model image; a body mask including a binary foreground and background segmentation of the undressed model image in the format of a semantic label map. Moreover, the subsequent image training inputs provide additional information regarding skin features (such as color, type, and so forth) and locations (such as location of image, location depicted in image, and so forth), are used to improve the prediction quality of the machine learning system.

Additionally, optionally, for neural network training of the machine learning system, a perception loss based on a weighted-average of convolutional layer responses of a network which classifies images into object categories is adopted. Specifically, reduction in perception loss enables the machine learning system to enhance run-time thereof, owing to easy and quick identification of features associated with images in training dataset. Therefore, providing subsequent image inputs comprising clear features associated therewith, for training of the machine learning system enhances operation of the machine learning system. In an example, there is 5% reduction of perception loss, owing to training of the machine learning system using the subsequent image training inputs.

Furthermore, the computer-implemented method receives the digital file including photorealistic changes from the machine learning system. The photorealistic changes included in the digital file are suitable for application to the composite image. Specifically, the digital file including photorealistic changes includes at least one of: instructions for applying one or more photorealistic changes, areas to target for applying the photorealistic changes, specific photorealistic changes for the inputted composite image. Optionally, the computer-implemented method generates a quality-enhanced composed image by applying the digital file including photorealistic changes, to the composite image. The final quality-enhanced composed image may be created by subtracting the digital file from the composite image inputted to the machine learning system. More optionally, a user employing the computer-implemented method manually generates a quality-enhanced composed image by applying some or all of features or changes comprised in the digital file including photorealistic changes, to the composite image.

Optionally, the computer-implemented system stores the digital file including the photorealistic changes. The said digital fie may be stored in a database of a computer implementing the computer-implemented method or and external database. More optionally, the digital file including the photorealistic changes, is imported into an editing tool, wherein the computer-implemented method enables the user to edit the composite image based on the photorealistic changes, thereby substantially decreasing time and effort in developing the composite image realistically. The digital file may be imported into a third-party photo editing tool (for example Photoshop) as one or more layers, for revision and manual layering composition of the digital image or the composite image.

The computer-implemented method for providing photorealistic changes for a digital image, in which a machine learning system is used to generate a digital file including photorealistic changes, suitable for application to a composite image, the composite image obtained by overlaying one or more digital cutout garment textures, according to an indexed outfitting layering order, on a digital image of a dressable model.

In an alternate implementation of the computer-implemented method as described herein above, the computer-implemented method for providing photorealistic changes for a digital image includes steps of receiving the digital image of the dressable model wherein the digital image of the dressable model may be 3-dimensional. The computer-implemented method further receives one or more digital cutout garment textures, including depth information, aligned with the body shape and pose of the dressable model. The depth information is defined for each of pixels of the digital image of the dressable model and/or the digital image comprising one or more digital cutout garment textures. Optionally, the depth information for the one or more digital cutout garment textures is acquired using a depth imaging camera (such as a three-dimensional camera, a volumetric camera, and the likes). More optionally, the depth information is acquired from a depth map, wherein the depth map is created using for example, binocular stereo vision. Moreover, the depth information may provide conversion methods, focus information, camera calibration data, and so forth. Optionally, the depth information is used by the computer-implemented method to convert 3-dimensional images to two-dimensional images for optimal processing thereof, by the machine learning system. The computer-implemented method receives binary silhouettes of the one or more digital cutout garment textures, and receives the composite image obtained by overlaying the one or more digital cutout garment textures ordered according to the depth information, and using the binary silhouettes, on the digital image of the dressable model. Furthermore, the computer-implemented method inputs the composite image, including the depth information, into the machine learning system for providing photorealistic changes and further receives from the machine learning system the digital file including photorealistic changes, suitable for application to the composite image.

In the aforesaid embodiment, the composite image is generated from the digital image of the dressable model and the digital image having one or more digital cutout garment textures, by a pixel-wise or region-wise depth-ordering provided in the depth information (for example, as a depth map or 3D information). Moreover, the depth information may be generated by using a depth image captured by a depth camera (e.g. Microsoft Kinect). Alternatively, the depth information may be generated by assigning or editing z-values of pixels and/or regions in two-dimensional digital images of the dressable model and/or two-dimensional digital image of one or more digital cutout garment textures, either programmatically or manually. Optionally, the depth information or 3D information is inferred from the composite image before inputting the composite image, including the depth information, into the machine learning system for providing photorealistic changes. It will be appreciated that the garment layer index mask is substituted by the depth information for processing of such images having depth, thereby allowing the machine learning system to generate the digital image including photorealistic changes having depth.

DETAILED DESCRIPTION OF THE DRAWINGS

Referring to FIG. 1, illustrated is a flow chart depicting steps of a computer-implemented method 100 for providing photorealistic changes for a digital image, in accordance with an embodiment of the present disclosure. The computer-implemented method 100 is depicted as a collection of steps in a logical flow diagram, which represents a sequence of steps that can be implemented in hardware, software, or a combination thereof, for example as aforementioned. At a step 102, a digital image of a dressable model is received. At a step 104, one or more digital cutout garment textures are received. Specifically, the one or more digital cutout garment textures are indexed according to an outfitting layering order and further aligned with a body shape and a pose of the dressable model. At a step 106, binary silhouettes of the one or more digital cutout garment textures is received. At a step 108, a garment layer index mask is generated by compositing the binary silhouettes of the one or more digital cutout garment textures, wherein the garment layer index mask is indexed according to the outfitting layering order. At a step 110, a composite image is received. Furthermore, the composite image is obtained by overlaying the one or more digital cutout garment textures, according to the indexed outfitting layering order, on the digital image of the dressable model. At a step 112, the composite image and the garment layer index mask are inputted into a machine learning system for providing photorealistic changes. At a step 114, a digital file is received from the machine learning system, wherein the digital file includes photorealistic changes, suitable for application to the composite image.

The steps 102, 104, 106, 108, 110, 112 and 114 are only illustrative and other alternatives can also be provided where one or more steps are added, one or more steps are removed, or one or more steps are provided in a different sequence without departing from the scope of the claims herein.

Figure 2:
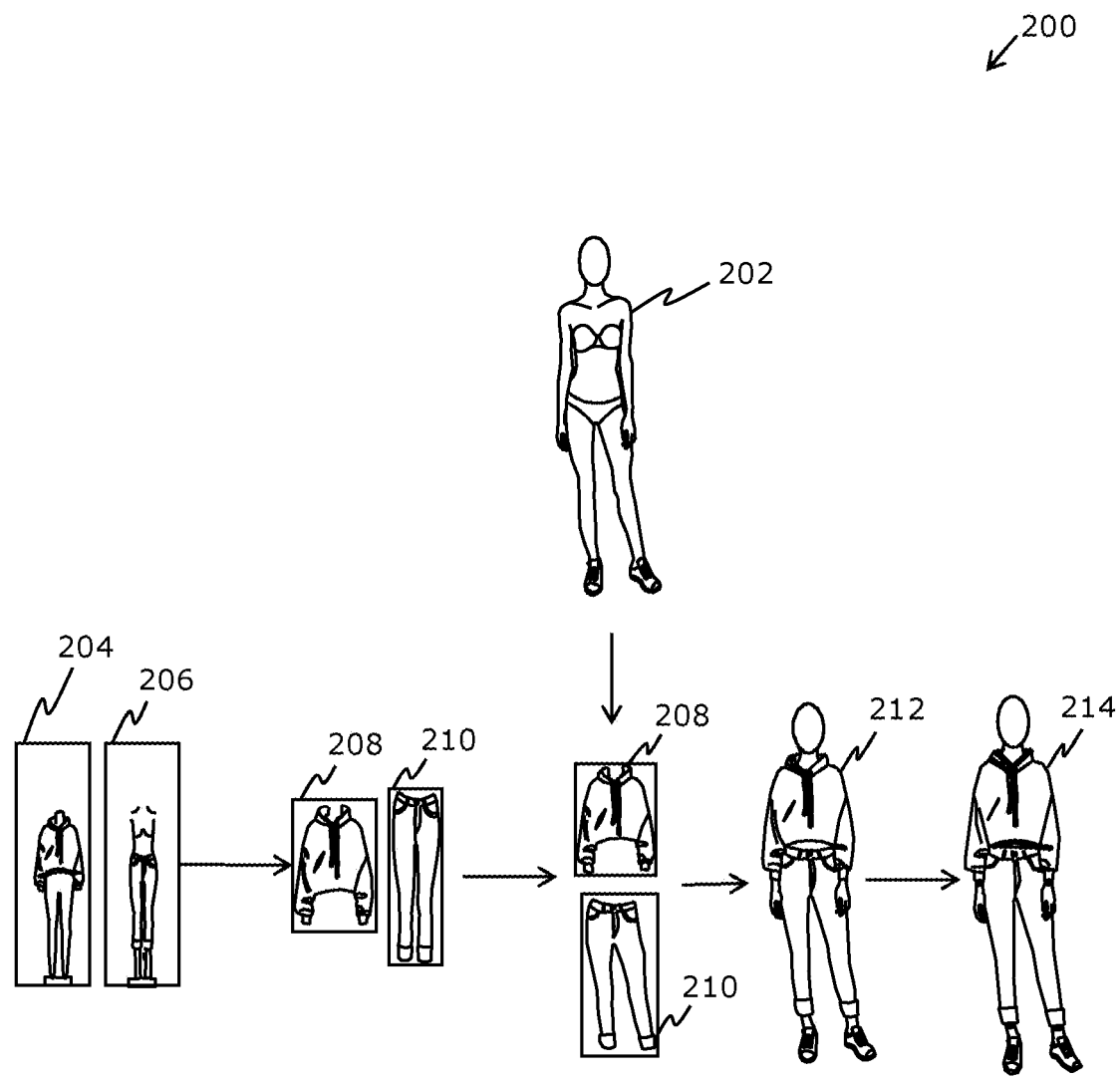
FIG. 2 illustrates a process of generation of a quality-enhanced composite image, in accordance with an embodiment of the present disclosure.

Referring to FIG. 2, illustrated is a process 200 of generation of a quality-enhanced composite image, in accordance with an embodiment of the present disclosure. At a first step, a digital image 202 of a dressable model is received. At a second step, a digital image 204 of a first garment, and a digital image 206 of a second garment are received. At a third step, one or more digital cutout garment textures are received. As shown, the one or more digital cutout garment textures comprise a first digital cutout garment texture 208 (namely, a top garment texture) from the digital image 204 of the first garment and a second digital cutout garment texture 210 (namely, a bottom garment texture) from the digital image 206 of the second garment.

Furthermore, at a fourth step, the first digital cutout garment texture 208 and the second digital cutout garment texture 210 are indexed according to an outfitting layering order and further aligned with a body shape and a pose of the dressable model in the digital image 202. At a fifth step, a composite image 212 is obtained by overlaying the first digital cutout garment texture 208 and the second digital cutout garment texture 210, according to the indexed outfitting layering order, on the digital image 202 of the dressable model. At a sixth step, a quality-enhanced composite image 214 is generated, wherein the quality-enhanced composite image 214 is generated by applying photorealistic changes to the composite image 212.

FIG. 2 is merely an example, which should not unduly limit the scope of the claims herein. It is to be understood that the simplified illustration of the process 200 of generation of a quality-enhanced composite image is provided as an example and is not to be construed as limiting the process 200 to specific steps, numbers, types, or arrangements. A person skilled in the art will recognize many variations, alternatives, and modifications of embodiments of the present disclosure.

Figure 3:
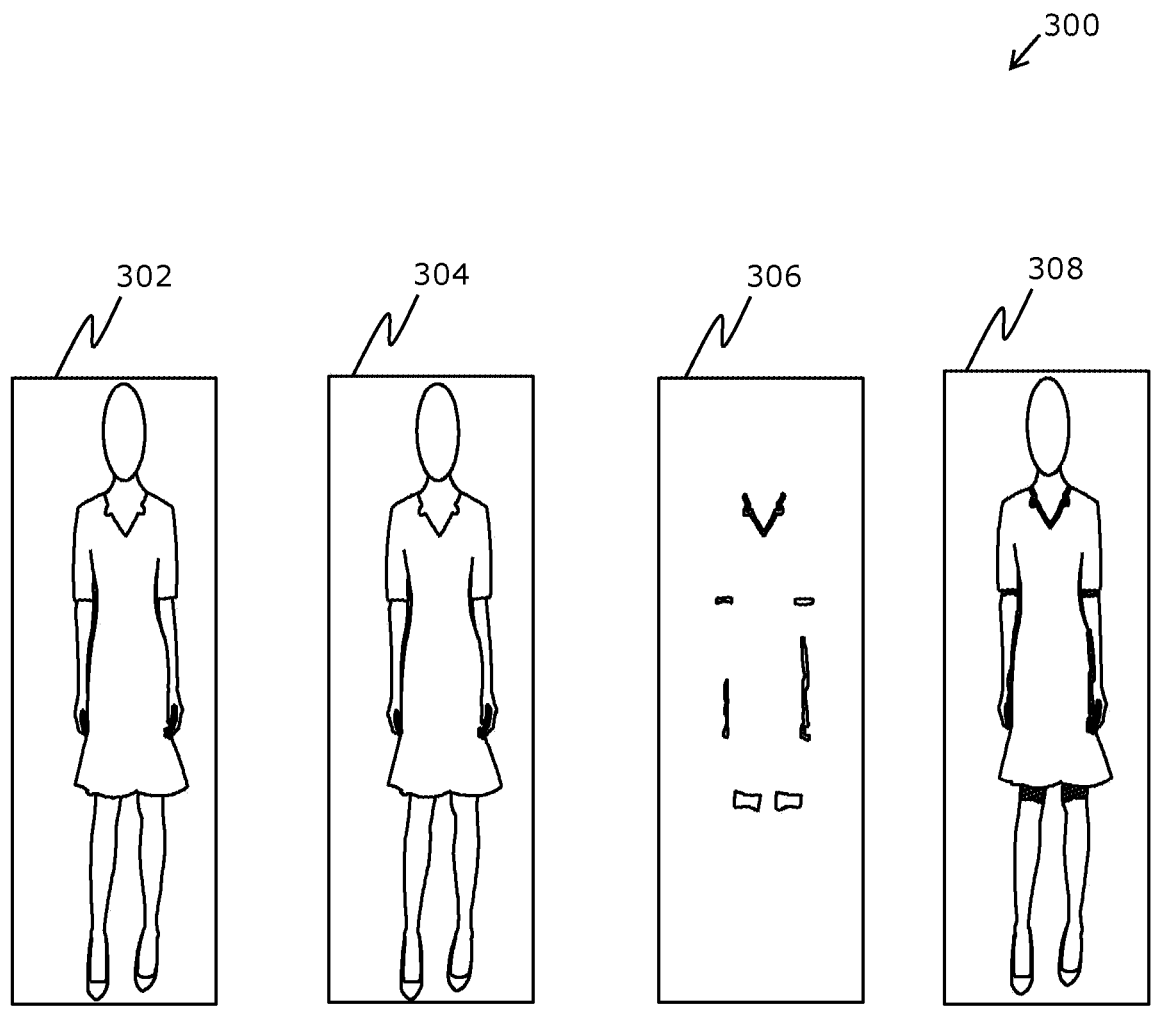
FIG. 3 illustrates a process of generation of a ground truth diff shadow image, in accordance with an embodiment of the present disclosure.

Referring to FIG. 3, illustrated is a process 300 of generation of ground truth diff shadow image, in accordance with an embodiment of the present disclosure. Specifically, the ground truth diff shadow image is generated for training a machine learning system. At a first step, an intermediate composed image 302 (namely, a no-shadow image) is obtained. The intermediate composed image 302 is obtained by overlaying one or more digital cutout garment textures (not shown), according to indexed outfitting layering order, on a digital image (not shown) of a dressable model. At a second step, a final composed image 304 (namely, an all-shadow image) is obtained. Specifically, the final composed image 304 is generated by applying photorealistic changes to the intermediate composed image 302. At a third step, the final composed image 304 is subtracted from the intermediate composed image 302 to generate the ground truth diff shadow image 306. At a forth step, an exaggerated marked-up view 308 of the ground truth diff shadow image 306 is generated, wherein the exaggerated marked-up view 308 indicates locations of shadow injection based on the ground truth diff shadow image 306.

FIG. 3 is merely an example, which should not unduly limit the scope of the claims herein. It is to be understood that the simplified illustration of the process 300 of ground truth diff shadow image is provided as an example and is not to be construed as limiting the process 300 to specific steps, numbers, types, or arrangements. A person skilled in the art will recognize many variations, alternatives, and modifications of embodiments of the present disclosure.

Figure 4:
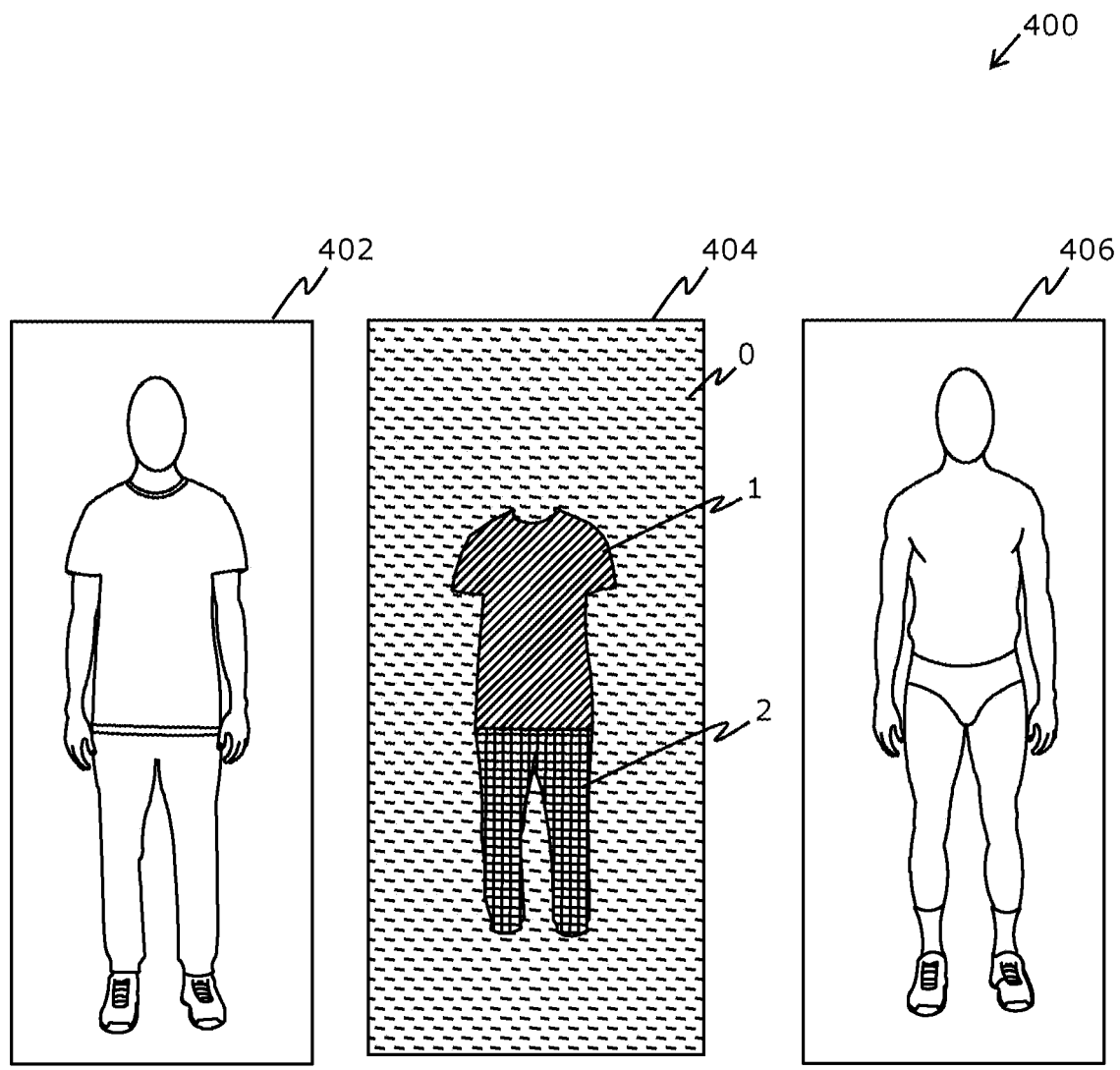
FIG. 4 illustrates an input data for a machine learning system for providing photorealistic changes for the input data, in accordance with an embodiment of the present disclosure.

Referring to FIG. 4, illustrated is an input data 400 for a machine learning system for providing photorealistic changes for the input data 400, in accordance with an embodiment of the present disclosure. As shown, the input data 400 comprises a composite image 402, wherein the composite image 402 is obtained by overlaying one or more digital cutout garment textures (not shown), according to an indexed outfitting layering order, on a digital image of a dressable model (shown as a digital image 406 of a dressable model). The input data 400 further comprises a garment layer index mask 404. The garment layer index mask 404 is generated by compositing binary silhouettes of the one or more digital cutout garment textures, wherein the garment layer index mask 404 is indexed according to the outfitting layering order. As shown, the garment layer index mask 404 is indexed as 0, 1, and 2, according to the outfitting layering order. Specifically, the outfitting layering order 0 indexes areas of background, the dressable model and shoes (as shown in the digital image 406 of the dressable model). The outfitting layering order 1 indexes area of trousers (namely, a digital cutout of a first garment texture), and the outfitting layering order 2 indexes area of top (namely, a digital cutout of a second garment texture). Optionally, the input data 400 also includes the digital image 406 of the dressable model. it will be appreciated that the machine learning system processes the input data 400 for providing photorealistic changes corresponding thereto.

Figure 5:
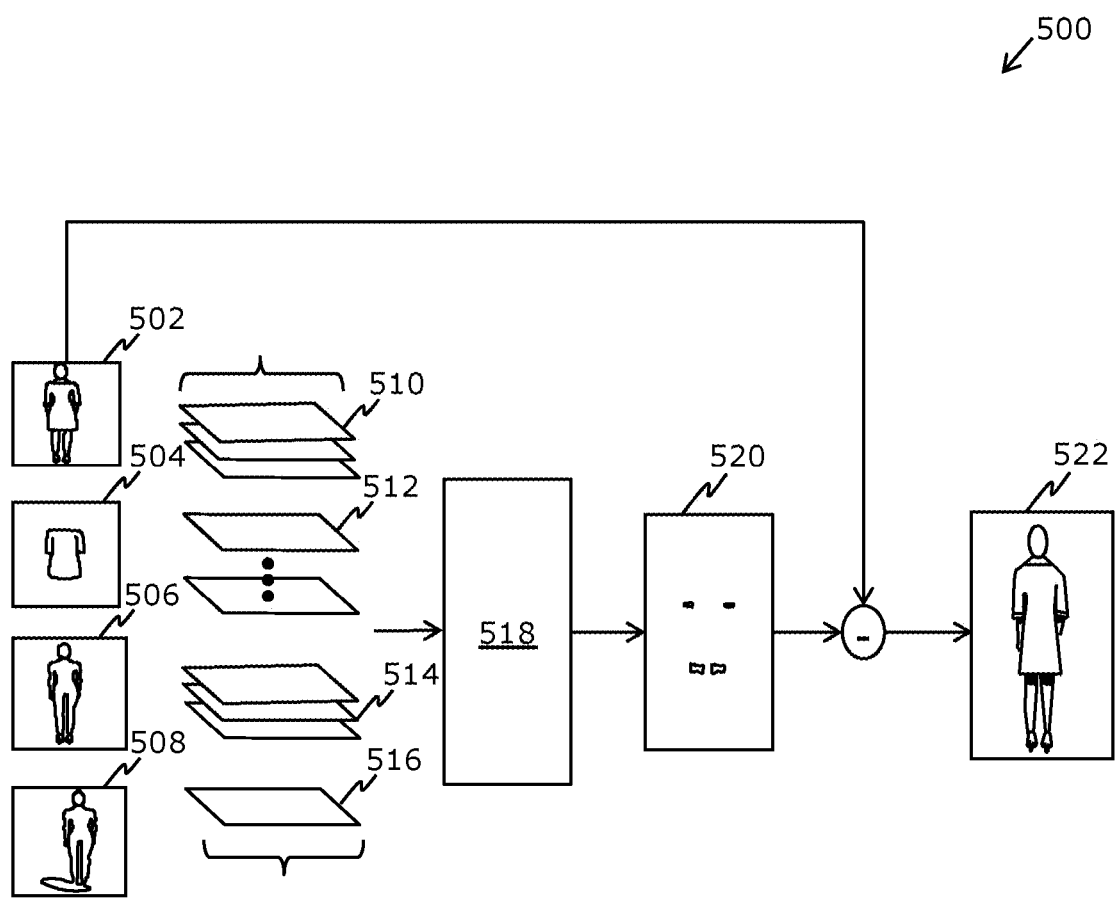
FIG. 5 is a high-level depiction of training of machine learning system using channel-stacked image, in accordance with an embodiment of the present disclosure.

Referring to FIG. 5, illustrated is a high-level depiction of training of machine learning system using a channel-stacked image, in accordance with an embodiment of the present disclosure. As shown, the channel-stacked image is a consolidated image that combines an input image 502 (namely, a no-shadow composite image), a garment layer index mask 504, an undressed body image 506 (namely, a digital image of a dressable model), and a body mask 508 of the undressed image. Subsequently, two versions of the channel-stacked image (namely, a 'K+3' version and a 'K+8' version) are generated. It will be appreciated that 'K+3' version includes 3-channel 510 of the input no-shadow image 502 and K-channel 512 of one-hot encoded garment layer index mask 504. Additionally, the 'K+8' version includes 3-channel 510 of the input no-shadow image 502, K-channel 512 of the one-hot encoded garment layer index mask 104, 3-channel 514 of the undressed body image 506, and a 1-channel 516 of the body mask 508.

Moreover, the two version of the channel-stacked image are provided to the machine learning system 518. Specifically, the channel-stacked image provides unified inputs into CRN employed by the machine learning system 518. Furthermore, the machine learning system generates a digital file 520 including photorealistic changes for the channel stacked image. Subsequently, a final quality-enhanced composed image 522 (namely, all shadow image) is created by subtracting the digital file 520 from a composite image (namely, input no-shadow image 502).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method for providing photorealistic changes for a digital image, the method including steps of:
   (i) receiving a digital image of a dressable model;
   (ii) receiving one or more digital cutout garment textures, indexed according to an outfitting layering order, aligned with a body shape and a pose of the dressable model;
   (iii) receiving binary silhouettes of the one or more digital cutout garment textures;
   (iv) generating a garment layer index mask by compositing the binary silhouettes of the one or more digital cutout garment textures, indexed according to the outfitting layering order;
   (v) receiving a composite image obtained by overlaying the one or more digital cutout garment textures, according to the indexed outfitting layering order, on the digital image of the dressable model;

(vi) inputting the composite image and the garment layer index mask into a machine learning system for providing photorealistic changes; and (vii) receiving from the machine learning system a digital file including photorealistic changes, suitable for application to the composite image;

the method including the step of storing the digital file including the photorealistic changes.

2. The method of claim 1, wherein the step (i) includes generating or receiving a binary mask of the digital image of the dressable model, and wherein step (vi) includes inputting the binary mask of the digital image of the dressable model into the machine learning system for providing photorealistic changes.

3. The method of claim 1, including a step in which the received composite image is generated by overlaying the one or more digital cutout garment textures, according to the indexed outfitting layering order, on the digital image of the dressable model.

4. The method of claim 1, including steps in which
(a) each of the one or more digital cutout garment textures is generated by separating or cutting out a garment in a foreground of the image from a garment image background, and then
(b) is transformed or warped to match or align with the body shape and pose of the model.

5. The method of claim 1, including a step of generating a quality-enhanced composed image by applying the digital file including photorealistic changes, to the composite image.

6. The method of claim 1, in which the photorealistic changes are one or more of: a shadow or shadows, a crease or creases, a scene background or scene backgrounds, a scene setting or scene settings, an animation or animations, or lighting adaption.

7. The method of claim 1, including a step in which the machine learning system is trained.

8. The method of claim 7, (a) including a step in which to train the machine learning system at least 1,000 images are used; or
(b) in which the step in which the machine learning system is trained includes a multi-stage iterative training process wherein the machine learning system is initially trained using a model for low-resolution-images, and then is gradually re-trained or fine tuned for greater image resolutions through weight-sharing to produce a training model.

9. The method of claim 1, wherein the digital images are 2D images.

10. The method of claim 1, (a) wherein the method generates ground truth diff shadow image by subtracting a final composed image from an intermediate composed image obtained after overlaying one or more digital cutout garment textures, according to indexed outfitting layering order, on digital image of dressable model, for training the machine learning system; or
(b) wherein the digital image of a dressable model is selected based on a predetermined selection criterion or criteria; or
(c) wherein each binary silhouette is generated by extracting and thresholding alpha channel of a respective digital cutout garment texture; or
(d) in which background regions and regions containing the undressed model or any garments or accessories within the undressed model image are all indexed with the lowest layering order index value.

11. The method of claim 1, wherein the garment layer index mask conveys important spatial information that guides the machine learning system on how and where to precisely render photo realistic features.

12. The method of claim 11, wherein the garment layer index mask conveys important spatial information that guides the machine learning system on, in which direction such photo realistic features should be added.

13. The method of claim 1, wherein subsequent image training inputs are used to improve prediction quality of the machine learning system.

14. The method of claim 13, (a) wherein the subsequent image training inputs include one or more of: an undressed model image; an undressed model image in format of a three channel RGB image; a body mask including a binary foreground and background segmentation of the undressed model image; a body mask including a binary foreground and background segmentation of the undressed model image in the format of a semantic label map; or
(b) wherein the subsequent image training inputs, which provide additional information regarding the skin features and locations, are used to improve the prediction quality of the machine learning system.

15. The method of claim 1, (a) wherein for neural network training of the machine learning system, a perception loss based on a weighted-average of convolutional layer responses of a network which classifies images into object categories is adopted; or
(b) wherein the machine learning system includes a machine learning module; or
(c) wherein the machine learning system includes a cascade refinement network (CRN).

16. The method of claim 1, wherein the machine learning system uses a cascade refinement network (CRN) containing a cascade of N convolutional layers blocks working at low spatial resolutions to high spatial resolutions, in which lowest resolution version of input image $L_0$ is fed into first block (block 1); feature output $F_i$ of each block i (i=1, 2 . . . N−1) of resolution r are upsampled and then combined with inputs $L_i$+1 scaled at working resolution 2r of block i+1 to be passed as input of next block i+1 in the cascade, and repeated up to last block (block N) of the network, which generates the digital file including photorealistic changes.

17. The method of claim 16, wherein a channel-stacked image provides unified inputs $L_i$ (i=1, 2, . . . N) into the CRN, wherein the channel-stacked image is a consolidated image that combines the garment layer index mask input with the undressed body image and a body mask.

18. The method of claim 17, (I) wherein two channel-stacked images are used alongside each other:
(a) K+3 channel-stacked image, which includes 3-channel of RGB no-shadow images, K-channel of one-hot encoded garment layer index mask images, wherein all source images are normalized to same size, and
(b) K+8 channel-stacked image, which include 3-channel of the RGB no-shadow images, K-channel of the one-hot encoded garment layer index mask images, 3-channel of the undressed model photos, and a 1-channel binary body mask; or
(II) wherein two channel-stacked images are used alongside each other:
(a) K+3 channel-stacked image, which include 3-channel of RGB no-shadow images, K-channel of one-hot encoded garment layer index mask images, wherein all source images are normalized to same size, and (b) K+8 channel-stacked image, which include 3-channels of the RGB no-shadow images, K-channels of the one-hot encoded garment layer index mask images, 3-channels of the undressed model photos, and a 1-channel binary body mask generated from an undressed model photo using an automatic image segmentation algorithm; or (III) wherein for CRN training, the channel-stacked images are scaled to different resolution to be fed as input $L_i$ to each block i (i=1, 2, ... N).

19. The method of claim 1, wherein the method uses automated scripts to parse stored data profiles of photo-editing tools, to automatically extract required layers and intermediate image layers from those parsed files, and transform file data to obtain required input-output pairs needed for model training.

20. The method of claim 1, wherein the digital images are 3D images.

21. The method of claim 1, (a) in which the received one or more digital cutout garment textures are obtained from a database; or (b) in which the received digital image of the dressable model is one in which the dressable model has been separated from a background; or (c) in which the received one or more digital cutout garment textures require no manipulation.

22. A computer program product comprising a non-transitory computer-readable storage medium, and is executable on a processor to provide a digital file including photorealistic changes for a digital image, the computer program product executable to:
(i) receive a digital image of a dressable model;
(ii) receive one or more digital cutout garment textures, indexed according to an outfitting layering order, aligned with the body shape and pose of the dressable model;
(iii) receive binary silhouettes of the one or more digital cutout garment textures;
(iv) generate a garment layer index mask by compositing the binary silhouettes of the one or more digital cutout garment textures, indexed according to the outfitting layering order;
(v) receive a composite image obtained by overlaying the one or more digital cutout garment textures, according to the indexed outfitting layering order, on the digital image of the dressable model;
(vi) input the composite image and the garment layer index mask into a machine learning system for providing photorealistic changes; and
(vii) receive from the machine learning system a digital file including photorealistic changes, suitable for application to the composite image;
the computer program product further executable to store the digital file including the photorealistic changes.

23. A system including a processor and a machine learning system, the processor configured to provide a digital file including photorealistic changes for a digital image, the processor configured to:
(i) receive a digital image of a dressable model;
(ii) receive one or more digital cutout garment textures, indexed according to an outfitting layering order, aligned with the body shape and pose of the dressable model;
(iii) receive binary silhouettes of the one or more digital cutout garment textures;
(iv) generate a garment layer index mask by compositing the binary silhouettes of the one or more digital cutout garment textures, indexed according to the outfitting layering order;
(v) receive a composite image obtained by overlaying the one or more digital cutout garment textures, according to the indexed outfitting layering order, on the digital image of the dressable model;
(vi) input the composite image and the garment layer index mask into the machine learning system for providing photorealistic changes; and
(vii) receive from the machine learning system a digital file including photorealistic changes, suitable for application to the composite image;
the system further configured to store the digital file including photorealistic changes.

* * * * *